(12) United States Patent
You et al.

(10) Patent No.: US 9,960,995 B2
(45) Date of Patent: May 1, 2018

(54) PACKET FORWARDING USING A PHYSICAL UNIT AND A VIRTUAL FORWARDING UNIT

(71) Applicant: Hangzhou H3C Technologies Co., Ltd., Hangzhou (CN)

(72) Inventors: Junping You, Beijing (CN); Guoliang Zheng, Beijing (CN); Hongyuan Wang, Beijing (CN); Haifeng Zhao, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 150 days.

(21) Appl. No.: 14/768,439

(22) PCT Filed: Mar. 25, 2014

(86) PCT No.: PCT/CN2014/074000
§ 371 (c)(1),
(2) Date: Aug. 17, 2015

(87) PCT Pub. No.: WO2014/154124
PCT Pub. Date: Oct. 2, 2014

(65) Prior Publication Data
US 2016/0014024 A1   Jan. 14, 2016

(30) Foreign Application Priority Data

Mar. 25, 2013 (CN) .......................... 2013 1 0096538

(51) Int. Cl.
*H04L 12/741* (2013.01)
*H04L 12/703* (2013.01)
(Continued)

(52) U.S. Cl.
CPC .............. *H04L 45/54* (2013.01); *H04L 12/46* (2013.01); *H04L 45/02* (2013.01); *H04L 45/28* (2013.01); *H04L 45/60* (2013.01); *H04L 61/103* (2013.01)

(58) Field of Classification Search
CPC ......... H04L 45/02; H04L 45/54; H04L 45/28; H04L 45/60; H04L 61/103; H04L 12/46; H04L 718/105
See application file for complete search history.

(56) References Cited

U.S. PATENT DOCUMENTS 8,059,658 B1 * 11/2011 Rovner ................... H04L 45/00
370/395.1
2007/0058606 A1 * 3/2007 Koskelainen ........... H04L 45/00
370/351
(Continued)

FOREIGN PATENT DOCUMENTS

CN    101005452 A    7/2007
CN    101106532 A    1/2008
(Continued)

OTHER PUBLICATIONS

International Search Report and Written Opinion dated Jul. 1, 2014 issued on PCT Patent Application No. PCT/CN2014/074000 dated Mar. 25, 2014, The State Intellectual Property Office, P.R. China.

*Primary Examiner* — Ian N Moore
*Assistant Examiner* — Mewale Ambaye
(74) *Attorney, Agent, or Firm* — Hewlett Packard Enterprise Patent Department

(57) ABSTRACT

In a method for forwarding a packet, a physical forwarding unit receives a data packet, may find a first subnet route based on a destination IP address of the data packet, and forwards the data packet to a virtual forwarding unit via an output interface of the first subnet route. The virtual forwarding unit receives the data packet may find a first host (Continued)

route based on the destination IP address of the data packet, and forwards the data packet based on the first host route.

15 Claims, 4 Drawing Sheets

(51) Int. Cl.
*H04L 12/46* (2006.01)
*H04L 12/751* (2013.01)
*H04L 12/773* (2013.01)
*H04L 29/12* (2006.01)

(56) References Cited

U.S. PATENT DOCUMENTS

2009/0257440 A1* 10/2009 Yan .................. H04L 45/02
370/401
2012/0063387 A1* 3/2012 Chen .................. H04W 4/006
370/328
2012/0291025 A1 11/2012 Kidambi et al.
2014/0254423 A1* 9/2014 Beesabathina .......... H04L 45/02
370/254

FOREIGN PATENT DOCUMENTS

| CN | 101695041 | | 4/2010 |
|----|-----------|---|--------|
| CN | 101719877 A | | 6/2010 |
| CN | 102916874 | | 2/2013 |
| EP | 2736191 | * | 5/2014 |

* cited by examiner

PACKET FORWARDING USING A PHYSICAL UNIT AND A VIRTUAL FORWARDING UNIT

CLAIM FOR PRIORITY

The present application is a national stage filing under 35 U.S.C 371 of PCT application number PCT/CN2014/074000, having an international filing date of Mar. 25, 2014, which claims the benefit of priority from Chinese Patent Application, No. 201310096538.2, having a filing date of Mar. 25, 2013, the disclosures of which are hereby incorporated by reference in their entireties.

BACKGROUND OF THE INVENTION

In a network device, a forwarding chip, e.g. an application specific integrated circuit (ASIC) chip may fast forward data packets based on maintained forwarding entries, such as Address Resolution Protocol (ARP) entries, Forwarding Information Base (FIB) entries, and Media Access Control (MAC) entries etc.

By using server virtualization technologies, a physical server can host multiple Virtual Machines (VMs). Each VM has its own Virtual Network Interface Card (VNIC), IP address and MAC address.

When a network device of a data center (e.g. a layer-three switch) sends data packet to the VM for the first time, the network device learns the MAC address of the VM based on the ARP protocol, generates an ARP entry and a host route, and stores the generated ARP entry and the host route in a physical forwarding chip of the network device.

Along with the increasing of the VMs, the number of the ARP entries and the host routes stored in the physical forwarding chip of the network device is increased. Generally, the number of entries supported by the physical forwarding chip is limited. When entry resources of the physical forwarding chip of the network device are occupied by large numbers of route entries, some forwarding application requirements cannot be satisfied by the network device.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Figure 1:
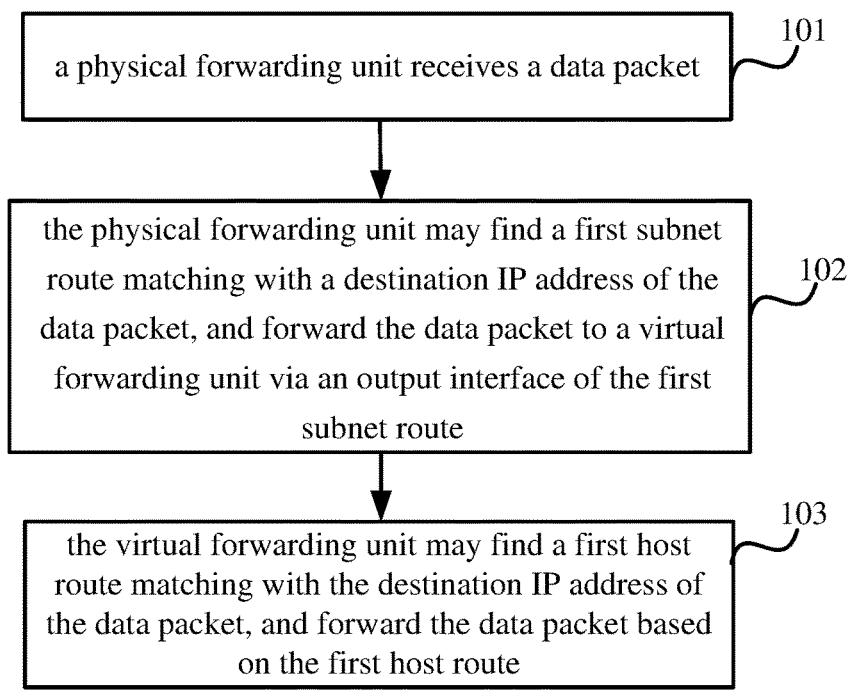
FIG. 1 is a schematic flowchart illustrating a procedure of forwarding a packet according to an example of the present disclosure.

FIG. 1 is a schematic flowchart illustrating a procedure of forwarding a packet according to an example of the present disclosure. As shown in FIG. 1, the procedure includes the following processing.

At block 101, a physical forwarding unit (also referred to as a physical forwarding chip) receives a data packet. The physical forwarding unit is a physical device for forwarding packets and may for example be an ASIC, FPGA or the like.

At block 102, the physical forwarding unit may find a first subnet route matching with a destination IP address of the data packet and forward the data packet to a virtual forwarding unit via an output interface of the found first subnet route. The virtual forwarding unit is a virtual forwarding device implemented by machine readable instructions executed by a processor; and may for example be implemented by a core of a multi core CPU. The machine readable instructions and forwarding tables of the virtual forwarding unit may be stored in a memory such as a RAM (Random Access Memory) which is accessible by the CPU.

At block 103, the virtual forwarding unit (also referred to as a virtual forwarding chip) may find a first host route matching the destination IP address of the data packet, and forward the data packet based on the found first host route. Therefore, the physical forwarding unit forwards the data packet to the virtual forwarding unit based on the subnet route, and then the virtual forwarding unit forwards the data packet, thereby avoiding that the entry resources of the physical forwarding unit are occupied by the host routes.

Figure 2:
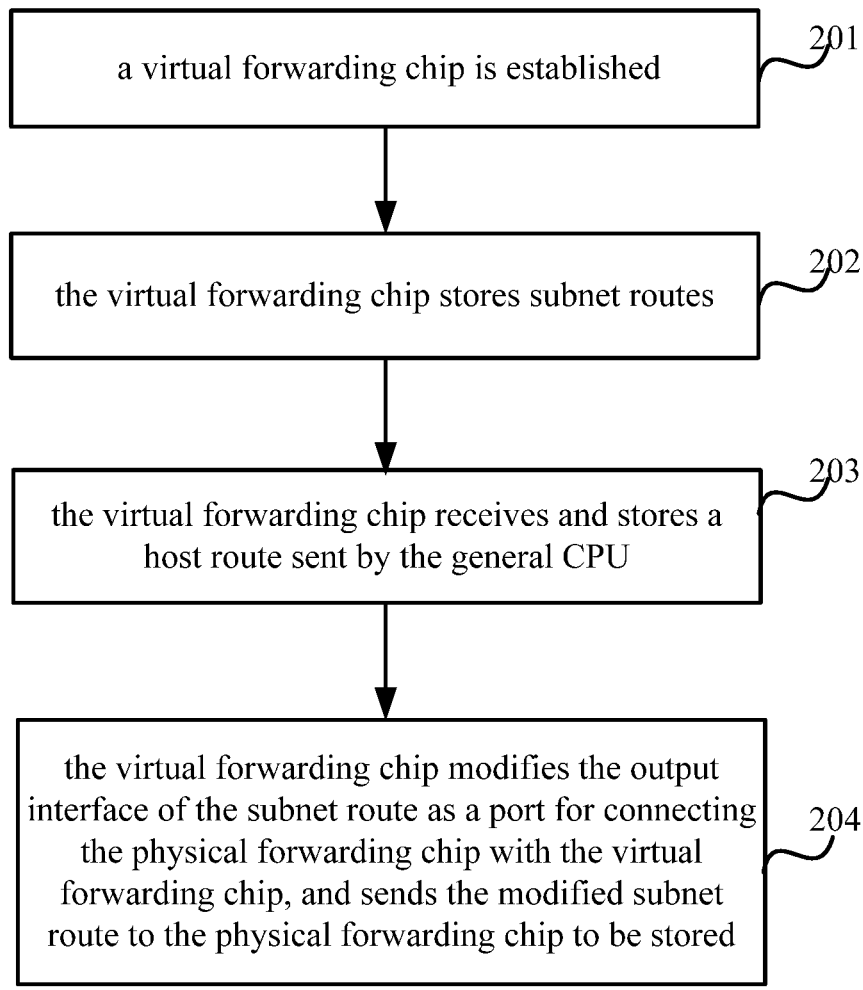
FIG. 2 is a schematic flowchart illustrating a procedure of storing forwarding information according to an example of the present disclosure.

FIG. 2 is a schematic flowchart illustrating a procedure of storing forwarding information according to an example of the present disclosure. As shown in FIG. 2, the procedure includes the following processing.

At block 201, a virtual forwarding chip is established.

A general CPU may include multiple cores. At least one core may be separated from the other cores of the general CPU and used as a virtual forwarding chip.

The virtual forwarding chip may implement software forwarding processes for some data packets, so as to share the burden with the physical forwarding chip.

At block 202, the virtual forwarding chip stores subnet routes.

For example, three IP addresses of 32 bits are 192.168.1.2, 192.168.1.3, 192.168.1.10 respectively and belong to the subnet route 192.168.1/24. For another example, four IP addresses of 32 bits are 192.168.1.2, 192.168.1.3, 192.168.1.10, 192.168.2.7 and belong to the subnet route 192.168/16.

The subnet route stored by the virtual forwarding chip at least includes an FIB entry and next-hop information. The FIB entry in the subnet route at least includes an IP address prefix of the subnet route which is called a network IP address for short. The next-hop information in the subnet route at least includes information of an output interface. The output interface is a virtual interface for indicating that the general CPU is to perform software forwarding for the data packets.

At block 203, the virtual forwarding chip receives and stores a host route sent by the general CPU.

When receiving a ARP protocol packet from a host or a VM, the general CPU of the network device learns a ARP entry and generates a host route. Then the generated host route is sent to the virtual forwarding chip to be stored.

Therefore, the entry resources of the physical forwarding unit of the network device are saved, and large numbers of the host routes of the VM need not occupy the forwarding entry resources of the physical forwarding unit, but may instead be handled by the virtual forwarding chip.

The data packets may be sent to the virtual forwarding chip for software processing.

At block 204, the virtual forwarding chip modifies the output interface of the subnet route as a port for connecting the physical forwarding chip with the virtual forwarding chip. The virtual forwarding chip then sends the modified subnet route to the physical forwarding chip to be stored.

For example, when the host route is 1.1.1.1/32, the virtual forwarding chip modifies the output interface of the subnet route 1.1.1.0/24 as a port for connecting the physical forwarding chip with the virtual forwarding chip. The subnet route 1.1.1.0/24 with the modified output interface is sent to the physical forwarding chip to be stored.

Figure 3:
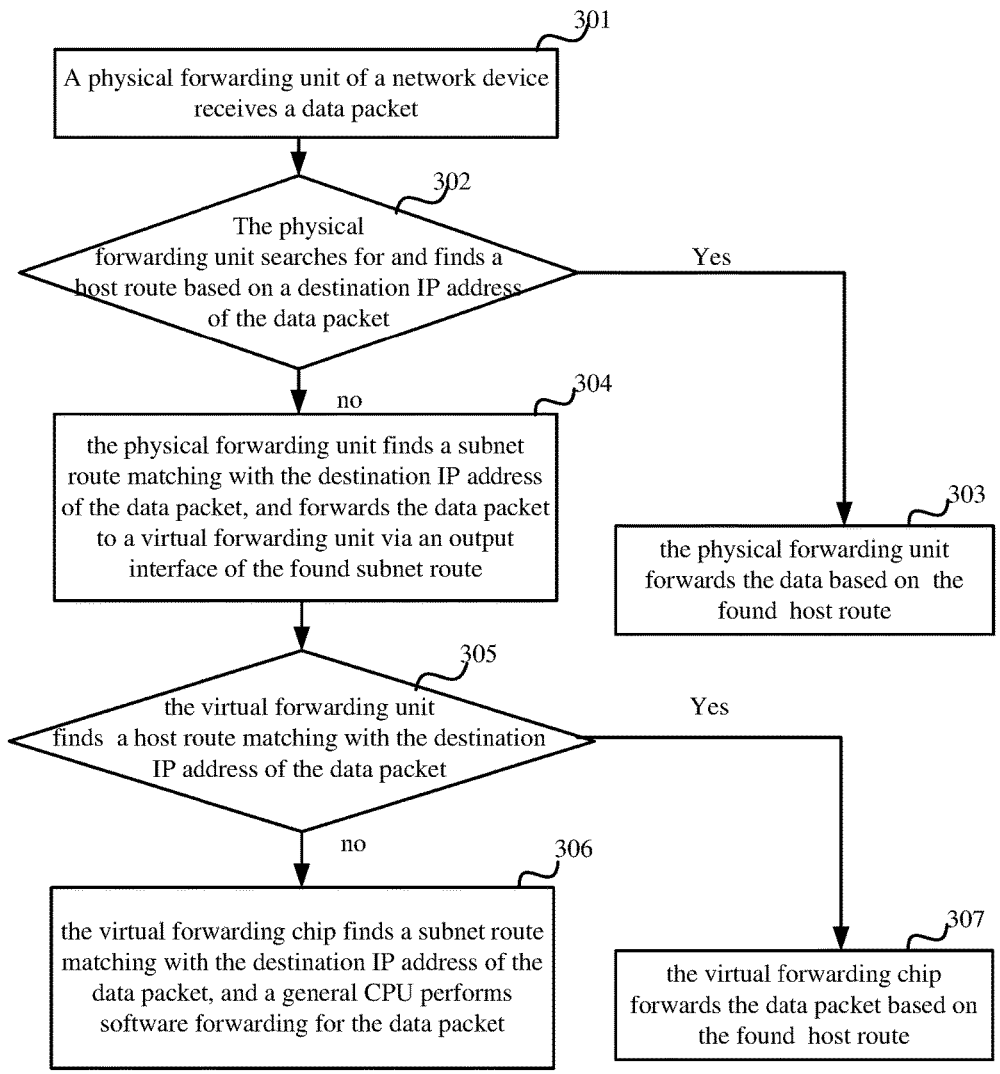
FIG. 3 is a schematic flowchart illustrating a procedure of forwarding a data packet according to an example of the present disclosure.

FIG. 3 is a schematic flowchart illustrating a procedure of forwarding a data packet according to an example of the present disclosure. As shown in FIG. 3, the procedure includes the following processing.

At block 301, a physical forwarding unit may receive a data packet.

At block 302, the physical forwarding unit may search for a host route based on a destination IP address of the data packet. If a host route matching the destination IP address is found, processing at block 303 is performed. If no host route matching the destination IP address is found, processing at block 304 is performed.

At block 303, the physical forwarding unit forwards the data packet based on the found host route.

At block 304, the physical forwarding unit may find a subnet route based on the destination IP address of the data packet. The physical forwarding unit may forward the data packet to a virtual forwarding unit via an output interface of the found subnet route which matches with the destination IP address of the data packet.

Because the output interface of the subnet route in the physical forwarding is the port for connecting with the virtual forwarding chip, the physical forwarding chip may forward the data packet to the virtual forwarding unit via the output interface of the subnet route, so as to forward the data packet.

At block 305, the virtual forwarding chip may receive the data packet, may find a host route based on the destination IP address of the data packet. If the host route is found based on the destination IP address, processing at block 307 is performed. If no host route matching the destination IP address is found, processing at block 306 is performed.

Based on an example, the virtual forwarding chip may take the destination IP address as a keyword, and search all host routes in the software mode maintained by the virtual forwarding chip.

At block 306, the virtual forwarding chip may find a subnet route based on the destination IP address of the data packet, and the general CPU perform software forwarding for the data packet.

Because the output interface of the subnet route stored by the virtual forwarding chip is a virtual interface for indicating that the general CPU is to perform software forwarding for the data packet. The general CPU is to forward the data packet based on an ARP entry and a host route entry which are generated based on the ARP protocol packet.

At block 307, the virtual forwarding chip may forward the data packet based on the found host route.

Based on an example, the virtual forwarding chip may further calculate frequency of use of the found host route. The frequency of use may for example correspond to the number of times that the host route is matched with a destination IP address within a particular period of time.

When a frequency of use of a host route reaches a preset frequency threshold, the virtual forwarding chip may send the host route to the physical forwarding chip to be stored.

Based on an example, the frequency threshold is preset based on a packet processing ability of the virtual forwarding chip. The frequency of use of the host route is related to the rate of the packet. The rate of the packet is number of packets destined to one destination IP address within every second. When the rate is high, the frequency of use of the host route based on the packet is increased, vice versa.

In one example, when a host route reaches or passes a frequency of use threshold, the virtual forwarding chip may send the host route to the physical forwarding chip to be stored. The physical forwarding chip may implement fast hardware forwarding for some data packets based on stored host routes, without sending the data packets to the virtual forwarding chip based on the subnet routes.

Figure 4:
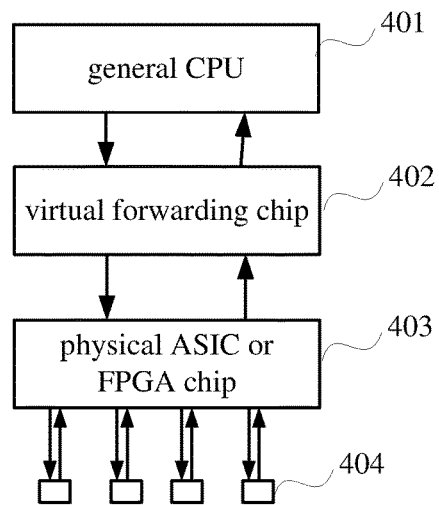
FIG. 4 is a schematic diagram illustrating data packet forwarding according to an example of the present disclosure.

As shown in FIG. 4, the network device 400 includes a general CPU 401, a virtual forwarding chip 402, a physical forwarding chip (e.g. ASIC or FPGA etc) and a physical port 404.

Subnet routes stored by the virtual forwarding chip 402 are shown in table 1-1.

TABLE 1-1

| Position of the entry | Subnet route | | Host route |
| --- | --- | --- | --- |
| Virtual forwarding chip | Subnet FIB entry 1.1.1.0/24 | Next-hop Port connecting with the general CPU | None |

As shown in table 1-1, in the subnet route stored by the virtual forwarding chip 402, the FIB entry includes an 24-bit IP address prefix 1.1.1.0, a 24-bit subnet mask, and the information of the next-hop includes a port connecting with the general CPU, which is a virtual interface for indicating that the general CPU is to perform software forwarding for a data packet.

The IP addresses and MAC addresses of the VM1~VM5 learned by the general CPU 401 based on the ARP protocol are as follows:

for VM1, the IP address is 1.1.1.1/32, the MAC address is 0000-0000-0001;

for VM2, the IP address is 1.1.1.2/32, the MAC address is 0000-0000-0002;

for VM3, the IP address is 1.1.1.3/32, the MAC address is 0000-0000-0003;

for VM4, the IP address is 1.1.1.4/32, the MAC address is 0000-0000-0004;

for VM5, the IP address is 1.1.1.5/32, the MAC address is 0000-0000-0005.

The general CPU 401 generates host routes of the VM1~VM5, and sends the generated host routes to the virtual forwarding chip 402 to be stored.

The subnet routes and the host routes stored by the virtual forwarding chip 402 are shown in table 1-2.

TABLE 1-2

| Position of the entry | Subnet route | | Host route | | |
|---|---|---|---|---|---|
| Virtual forwarding chip | Subnet FIB entry 1.1.1.0/24 | Next-hop Port connecting with the general CPU | Host FIB entry (1.1.1.1/32, arp1); (1.1.1.2/32, arp2); (1.1.1.3/32, arp3); (1.1.1.4/32, arp4); (1.1.1.5/32, arp5) | Next-hop Output interface 1 Output interface 2 Output interface 3 Output interface 4 Output interface 5 | ARP entry arp1, MAC address: 0000-0000-0001 arp2, MAC address: 0000-0000-0002 arp3, MAC address: 0000-0000-0003 arp4, MAC address: 0000-0000-0004 arp5, MAC address: 0000-0000-0005 |

As shown in table 1-2, in the five host routes stored by the virtual forwarding chip 402, the FIB entry includes an 32-bit IP address prefix, an 32-bit mask (i.e. 255.255.255.255) and an ARP index. The information of the next-hop includes an output interface for forwarding a data packet.

The virtual forwarding chip 402 sends the subnet route 1.1.1.0/24 to the physical forwarding chip 403 to be stored. The output interface of the subnet route 1.1.1.0/24 is the port for connecting the physical forwarding chip 403 with the virtual forwarding chip 402. The subnet route stored by the physical forwarding chip 403 is shown in table 1-3.

TABLE 1-3

| Position of the entry | Subnet route | | Host route |
|---|---|---|---|
| Physical forwarding chip | Subnet FIB entry 1.1.1.0/24 | Next-hop Output interface (a port connecting with the virtual forwarding chip) | None |

As shown in table 1-3, the physical forwarding chip 403 does not store the host route but merely stores the subnet route 1.1.1.0/24. In the subnet route stored by the physical forwarding chip 403, the FIB entry includes an 24-bit IP address prefix. The information of the next-hop includes a port for connecting with the virtual forwarding chip 402.

When one of the physical ports 404 receives a data packet of which a destination IP address is 1.1.1.1/32, the physical forwarding chip 403 finds the subnet route 1.1.1.0/24 based on the destination IP address 1.1.1.1/32, and sends the data packet to the virtual forwarding chip 402 based on the output interface of the subnet route 1.1.1.0/24 in table 1-3.

After receiving the data packet from the physical forwarding chip 403, the virtual forwarding chip 402 finds the host route 1.1.1.1/32 based on the destination IP address 1.1.1.1/32, and finds the ARP entry based on the ARP index in FIB entry of the found host route. The virtual forwarding chip 402 encapsulates the data packet (e.g. IP packet) into an Ethernet data packet based on the MAC address 0000-0000-0001 of the found ARP entry, and sends the Ethernet data packet via the output interface 1 in the next-hop.

The virtual forwarding chip 402 may further calculate a frequency of use of the host route when forwarding the data packet based on the host route. When the number of the data packets sent to the VM1 increases and the virtual forwarding chip 402 determines that the frequency of use of the host route 1.1.1.1/32 reaches a preset frequency threshold, the virtual forwarding chip 402 sends the host route 1.1.1.1/32 to the physical forwarding chip 403 to be stored. The subnet routes and the host route stored by the virtual forwarding chip 402 are unchanged.

The subnet route and the host route stored by the physical forwarding chip 403 are shown in table 1-4.

TABLE 1-4

| position of the entry | Subnet route | | Host route | | |
|---|---|---|---|---|---|
| Physical forwarding chip | Subnet FIB entry 1.1.1.0/24 | Next-hop Port for connecting to the virtual forwarding chip | Host FIB entry (1.1.1.1/32, arp1); | Next-hop Port 1 | ARP entry arp1, MAC address: 0000-0000-0001 |

As shown in table 1-4, in the host route stored by the physical forwarding chip 403, the FIB entry includes an 32-bit IP address prefix 1.1.1.1, a 32-bit mask (i.e. 255.255.255.255) and the ARP index arp 1. The next-hop includes the output interface for forwarding the data packet. In table 1-4, the subnet route stored by the physical forwarding chip 403 is not changed.

After receiving the data packet sent to the VM1 via one of the physical ports 404, the physical forwarding chip 403 forwards the data packet based on the host route shown in table 1-4.

After receiving the data packets sent to the VM2, VM3 or VM4 via the physical port 404, the physical forwarding chip 403 may send the data packets to the virtual forwarding chip 402 based on the subnet route shown in table 1-4. The virtual forwarding chip 402 forwards the data packets to the VM2, VM3 or VM4 based on the host routes in table 1-2.

According to an example, the physical forwarding chip 403 may dynamically update the host routes stored locally, so as to adapt to network changes.

After receiving the host route 1.1.1.1/32 from the virtual forwarding chip 402, the physical forwarding chip 403 configures an aging indication for the host route 1.1.1.1/32 and assigns a first value for the aging indication. After receiving the data packet sent to the VM1 and finding the host route 1.1.1.1/32, the physical forwarding chip 403 updates the aging indication as a second value. According to examples of the present disclosure, the first value and the second value may be configured as requirements. For example, the first value and the second value may be configured as 0 and 1 respectively.

The physical forwarding chip 403 may periodically checks the aging indications of the host routes stored locally. When it is determined that the aging indication of the host route 1.1.1.1/32 is the second value, the physical forwarding chip 403 modifies the value of the aging indication as the first value.

When the network device does not receives the data packet sent to the VM1 for a certain time period, the physical forwarding chip 403 checks the aging indications of the host routes stored locally, and deletes the host route 1.1.1.1/32 with the aging indication of the first value.

Figure 5:
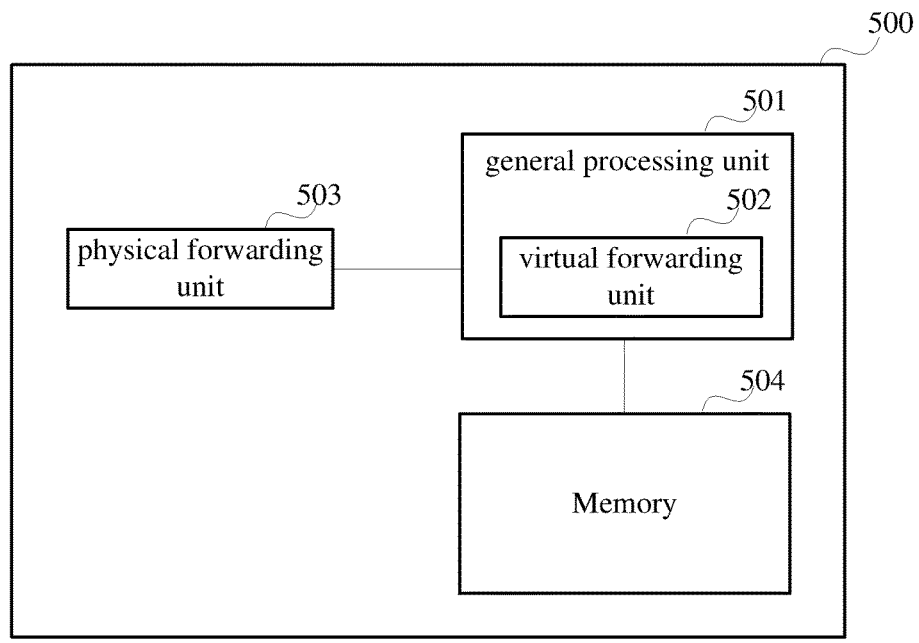
FIG. 5 is a schematic diagram illustrating a structure of a network device according to an example of the present disclosure.

FIG. 5 is a schematic diagram illustrating a structure of a network device according to an example of the present disclosure. As shown in FIG. 5, the network device 500 includes a general processing unit 501, a virtual forwarding unit 502, a physical forwarding unit 503 and a memory 504.

According to an example, the general processing unit 501 may be a general CPU with multiple cores, and at least one of the multiple cores is used to implement the virtual forwarding unit 502. The physical forwarding unit 503 may be a forwarding chip, e.g. an ASIC chip, FPGA etc. The memory 504 stores machine readable instructions and forwarding tables of the virtual forwarding unit 502 and may be accessible by the virtual forwarding unit 502. The memory 504 may also store machine readable instructions and forwarding tables for software forwarding and may be accessible by general processing unit 501.

The physical forwarding unit 503 receive a data packet, finds a first subnet route matching with a destination IP address of the data packet. The physical forwarding unit 503 then forwards the data packet to the virtual forwarding unit 502 via an output interface of the found first subnet route. The virtual forwarding unit 502 receives the data packet sent by the physical forwarding unit 503, finds a first host route matching with the destination IP address of the data packet. The virtual forwarding unit 502 then forwards the data packet based on the found first host route.

According to an example, the general processing unit 501 forwards the data packets when the virtual forwarding unit 502 finds no first host route matching with the destination IP address is not found.

According to an example, the general processing unit 501 may forward the data packet according to a generated host route or subnet route.

According to an example, the virtual forwarding unit 502 may calculate frequency of use of the first host route. When the frequency of use of the first host route reaches a preset frequency threshold, the virtual forwarding chip 502 may send the first host route as a second host route to the physical forwarding chip to be stored.

According to an example, the physical forwarding unit 503 may forward the received data packet based on a second host route matching with the destination IP address of the received data packet.

According to an example, the physical forwarding unit 503 updates a first aging indication of the found second host route as a second aging indication. The physical forwarding unit 503 deletes a second host route having the first aging indication at preset intervals, and changes a second host route having the second aging indication into a second host route having the first aging indication.

As can be seen from the above, in examples of the present disclosure, at least one of the multiple cores in the general CPU of the network device is used to implement the virtual forwarding chip. The virtual forwarding chip and the physical forwarding chip manage the host routes and the subnet routes together, and thus entry resources of the physical forwarding chip are saved compared with the case that the physical forwarding chip manages all of the routes. In addition, when the physical forwarding chip does not have the host route for forwarding the packet, the packet may be forwarded according to the host route maintained by the virtual forwarding chip, so that networking requirement of the data center is satisfied with less hardware resources, and entry resources may be greatly saved. The present disclosure may also be applied to the Internet protocol version 6 (IPv6) network as well as IPv4.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A method for forwarding a packet, comprising:
receiving, by a physical forwarding unit, a data packet;
in response to a determination that no host route matches a destination address of the data packet, finding, by the physical forwarding unit, a first subnet route connected to a virtual forwarding unit that matches the destination address of the data packet;
forwarding, by the physical forwarding unit, the data packet to the virtual forwarding unit via the found first subnet route, wherein the virtual forwarding unit is to forward the data packet to a destination; and
deleting, by the physical forwarding unit, a host route having a first aging indication at preset intervals, and updating a host route having a second aging indication as a host route having the first aging indication.

2. The method of claim 1, comprising:
in response to a determination by the virtual forwarding unit that no host route matches the destination address of the data packet, forwarding, by the virtual forwarding unit to a general processing unit, the data packet for the general processing unit to forward the data packet to the destination.

3. The method of claim 1, comprising:
finding, by the virtual forwarding unit, a first host route matching the destination address of the data packet and forwarding the data packet to the destination via the first host route;
calculating, by the virtual forwarding unit, a frequency of use of the first host route; and based on the frequency of use of the first host route reaching a preset frequency threshold, sending, by the virtual forwarding unit, the first host route to the physical forwarding unit to be stored.

4. The method of claim 1, comprising:
in response to a determination by the physical forwarding unit that a first host route matches the destination address of the data packet, forwarding, by the physical forwarding unit, the data packet to the destination via the first host route.

5. The method of claim 1, comprising:
in response to a determination by the physical forwarding unit that a first host route matches the destination address of the data packet, updating, by the physical forwarding unit, an aging indication of the first host route from a first value to a second value.

6. The method of claim 1, wherein the virtual forwarding unit is implemented by a general processing unit.

7. A network device for forwarding a packet, comprising:
a general processing unit, a virtual forwarding unit and a physical forwarding unit,
wherein the physical forwarding unit is to:
receive a data packet;
in response to a determination that no host route matches a destination address of the data packet, find a first subnet route connected to a virtual forwarding unit that matches the destination address of the data packet; and
forward the data packet to the virtual forwarding unit via the found first subnet route, wherein the virtual forwarding unit is to forward the data packet to a destination and
wherein the physical forwarding unit is to delete a host route having a first aging indication at preset intervals, and update a host route having a second aging indication as a host route having the first aging indication.

8. The network device of claim 7, wherein the general processing unit is to forward the data packet when the virtual forwarding unit finds no host route matching the destination address.

9. The network device of claim 7, wherein the virtual forwarding unit is to forward the data packet to the destination via a first host route and calculate a frequency of use of the first host route, and
based on the frequency of use of the first host route reaching a preset frequency threshold, the virtual forwarding unit is to send the first host route to the physical forwarding unit to be stored.

10. The network device of claim 7, wherein, in response to a determination that a host route matches the destination address, the physical forwarding unit is to forward the data packet to the destination via the host route.

11. The network device of claim 7, wherein the physical forwarding unit is to delete a host route having a first aging indication at preset intervals, and update a host route having a second aging indication as a host route having the first aging indication.

12. A non-transitory computer readable storage medium storing instructions that when executed by a processor of a device cause a physical forwarding unit of the device to:
receive a data packet;
in response to a determination that no host route matches a destination address of the data packet, find a subnet route connected to a virtual forwarding unit that matches the destination address of the data packet; and
forward the data packet to the virtual forwarding unit via the found subnet route, wherein the virtual forwarding unit is to forward the data packet to a destination,
wherein the processor is to cause the physical forwarding unit to delete a host route having a first aging indication at preset intervals, and update a host route having a second aging indication as a host route having the first aging indication.

13. The non-transitory computer readable storage medium of claim 12, wherein the instructions are to cause the virtual forwarding unit to:
in response to a determination by the virtual forwarding unit that a first host route matches the destination address of the data packet, forward the data packet to the destination via the first host route; and
in response to a determination by the virtual forwarding unit that no host route matches the destination address of the data packet, forward the data packet to the processor for the processor to forward the data packet to the destination.

14. The non-transitory computer readable storage medium of claim 13, wherein the instructions are to cause the virtual forwarding unit to:
calculate a frequency of use of the first host route; and
based on the frequency of use of the first host route reaching a preset frequency threshold, send the first host route to the physical forwarding unit to be stored.

15. The non-transitory computer readable storage medium of claim 12, wherein the instructions are to cause the physical forwarding unit to:
in response to a determination by the physical forwarding unit that a host route matches the destination address, update an aging indication of the host route from a first value to a second value.

* * * * *